United States Patent [19]

Stair

[11] 4,180,362

[45] Dec. 25, 1979

[54] SYSTEM TO TRANSFER CARGO OR PASSENGERS BETWEEN PLATFORMS WHILE UNDERGOING RELATIVE MOTION

[75] Inventor: Leslie D. Stair, Seattle, Wash.

[73] Assignee: The Boeing Company, Seattle, Wash.

[21] Appl. No.: 903,372

[22] Filed: May 5, 1978

[51] Int. Cl.[2] .............................................. B65G 67/58

[52] U.S. Cl. .................................... 414/139; 254/172; 414/786

[58] Field of Search ....................... 414/137, 138, 139; 254/172; 212/3; 258/1.2, 1.4

[56] References Cited

U.S. PATENT DOCUMENTS

| | | | |
|---|---|---|---|
| 3,064,829 | 11/1962 | Winfrey et al. | 414/139 |
| 3,398,934 | 8/1968 | Lancashire et al. | 254/172 X |
| 3,817,033 | 6/1974 | Appel et al. | 254/172 X |
| 4,025,055 | 5/1977 | Strolenberg | 254/172 |

*Primary Examiner*—L. J. Paperner
*Attorney, Agent, or Firm*—Thomas H. Murray; Clifford A. Poff

[57] ABSTRACT

A carrier for cargo or personnel is transferred between an offshore platform and a landing platform on a vessel while subject, one with respect to the other, to vertical and lateral movements due to waves and wind within an envelope of motion. When the carrier is on the offshore platform, it is lowered by a cable from a constant tension level lifting winch to a point above the envelope of motion by the landing platform on a vessel. A trailing end of this cable is coupled to the cable of a downhaul winch having variable constant tension levels on the vessel. Slack is eliminated in the coupled cables and the carrier is caused to rise and fall with the movement of the vessel through a preestablished constant tension level by the lifting winch. Constant tension is developed in the coupled cables when the vessel moves toward the carrier within the envelope of motion while the downhaul winch is set at a higher tension level and zero winding speed. The carrier is then drawn onto the landing platform by energizing the downhaul winch to a desired winding speed at the higher constant tension level. Slack is eliminated from the coupled cables by energizing the lifting winch when the carrier and the lifting platform approach each other. The carrier is retained on the landing platform by energizing the downhaul winch to the higher constant tension level. The downhaul winch is then energized to a tension level less than the tension level of the lifting winch when the carrier recedes away from the lifting platform and when the carrier is lifted from the landing platform by the lifting winch. The cable take-up velocity is maintained at a value exceeding the vertical relative motion between the platforms.

12 Claims, 3 Drawing Figures

SYSTEM TO TRANSFER CARGO OR PASSENGERS BETWEEN PLATFORMS WHILE UNDERGOING RELATIVE MOTION

BACKGROUND OF THE INVENTION

This invention relates to the transfer of cargo or personnel between two platforms which have relative motion with respect to one another either vertically or laterally, and more particularly to a system used to control the rate of closure, separation and landing site of a carrier for the cargo or personnel transferred between such platforms.

The presence of wind and waves has a degrading effect to the transfer of cargo between a supply vessel and an offshore platform giving rise to the need for precise control of the rate of closure, separation and landing site of the cargo. The carrier for cargo or passengers is subject to displacements due to wind forces when the carrier is raised and lowered by a winch located on the offshore platform. Both fixed and floating platforms are subject to motions due to the force of waves acting on the structure below the platform. The supply vessel is subject to wave forces which cause it to undergo vertical, lateral and angular motions. The supply vessel must be maneuvered to maintain the landing site on the vessel within an area subtended by the boom for a cable extending from the offshore platform. During the transfer operation, the operator for the winch on the offshore platform attempts to control both the rate of closure by the carrier with the vessel and the touchdown site on the vessel through manipulation of the boom and the length of the winch cable. This traditional mode of carrier and/or personnel transfer is satisfactory during calm water and low sea states, but degrades sufficiently as the seas and wind increase to cause a suspension to the transfer operation.

The operator for the winch on the offshore platform is located remotely from the scene of the carrier landing on the vessel. Therefore, the operator cannot adequately compensate for the vertical and lateral motions of the vessel below the platform, particularly when the vessel is subject to increased wave forces degrading the ship's maneuvering capability, thus lessening control of the landing site. Attempts have been made in the past to compensate for the inability of an operator for a winch on a platform to compensate for the vertical and lateral motions of a vessel during a transfer operation through the use of a tether line coupled between the vessel and the platform. The tether line is used to provide a measure, through a suitable transducer system, of the relative motion for control of the winch on the platform. Examples of this form of transfer system are shown in U.S. Pat. Nos. 3,662,991, 3,648,858, 3,675,900, 3,591,022, 2,875,255, 3,189,195 and 3,753,552.

Alternative apparatus for the transfer of cargo between a platform and a vessel includes articulated landing ramps. However, such ramps have met with limited success, particularly in view of the fact that the supply vessel must closely approach the offshore platform with the attendant danger of collision between the supply vessel and the platform. Moreover, an articulated ramp assembly must be provided for each side of the offshore platform in order that transfer operations are conducted at the lee side of the structure. This reduces the severity of the seas at the site of the transfer operations and enables the positioning of the supply vessel in a manner so that the wave forces act in a direction to move the vessel way from the platform structure in the event of a ship malfunction. Devices, such as articulated ramps, become excessively long when used where waves of large amplitude are encountered in order to minimize the angular motion. The ramps are heavy, difficult to engage and expensive.

The present invention is addressed to improvements in a cargo transfer system through the use of a system including a downhaul winch on the vessel and a lifting winch on the platform. Systems of this general type are shown in U.S. Pat. Nos. 3,398,934 and 4,025,055. However, these systems do not provide for a cargo and/or passenger transfer systems at a controlled rate of closure or separation through constant cable tension under the control of an operator at the designated landing site.

SUMMARY OF THE INVENTION

It is an object of the present invention to provide a method and apparatus to control the rate of closure or separation and landing site for cargo or personnel during transfer between two platforms while subject to vertical or lateral motion, one with respect to the other.

It is a further object of the present invention to provide a method and apparatus for transferring cargo and/or passengers between two platforms while subject to motion, one with respect to the other, through the use of a carrier joined to coupled cables extending from a constant tension winch on one platform and a variable constant tension winch having two tension levels on the second platform; the variable constant tension levels on the second platform being greater than and less than the tension level of the constant tension winch on the first platform.

It is a further object of the present invention to provide a method and apparatus for transferring cargo and/or passengers between two platforms subject to relative motion such as defined by an offshore platform and a supply vessel wherein a carrier is connected to two winch cables that are controlled for movement in response to a tension differential established between constant tension level winches at a controlled rate of closure or separation between the carrier and the supply vessel; for touchdown at a designated landing site on the landing platform on the supply vessel; for carrying out transfer operations without the need to maintain vertical alignment to the carrier cable; and for providing control of carrier movement at each destination thereof by an operator who has direct visual contact with the carrier at the destination.

More specifically, according to the preferred embodiment of the present invention, there is provided a relative motion transfer system utilizing a constant tension winch on an offshore platform and a variable constant tension winch on the supply vessel. The variable constant tension winch has one constant tension level less than the tension level by the winch on the offshore platform and a second tension level greater than the constant tension level by the winch on the offshore platform. A carrier is supported by a cable extending between the two platforms, typically by joining together the ends of the cables for each of the winches. The winch having the greatest relative tension level controls the direction of carrier motion. The winch having the lower tension level prevents slack in the cable in the presence of relative motion between the offshore platform and the vessel. The carrier is landed on the supply vessel by an operator located on the supply vessel by selecting the higher tension level for the downhaul winch on the vessel and controlling the rate of carrier closure or separation by adjusting the speed and direction of the winch. The invention provides that the operator on the supply vessel assumes control of the operation whenever the carrier approaches the envelope of motions described by the supply vessel. When the carrier is outside the envelope of motion, the operator on the supply vessel sets the lower tension level on the winch located thereon whereby control is transferred to the operator for the winch on the offshore platform.

These features and advantages of the present invention as well as others will be more fully understood when the following description is read in light of the accompanying drawings, in which.

Figures 1, 2, 3:
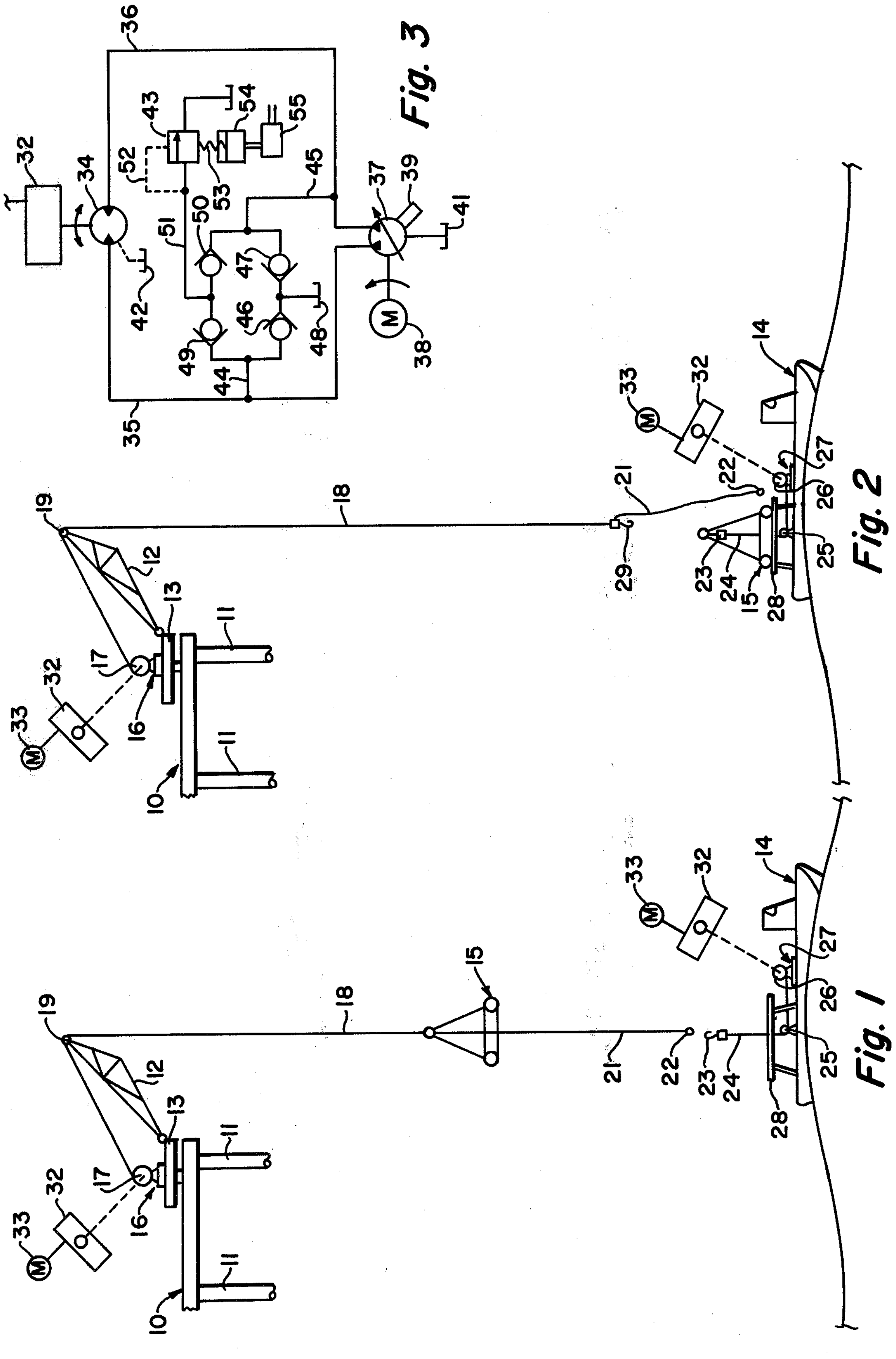
FIG. 1 is a schematic illustration of the system for transferring a carrier between a lifting platform and a vessel according to the present invention where the carrier remains with the lifting platform.
FIG. 2 is a schematic illustration of the system for transferring a carrier between a vessel and a lifting platform according to the present invention where the carrier remains with the vessel.
FIG. 3 is a schematic illustration of a hydraulic system for powering the constant tension level winches.

In FIGS. 1 and 2, there is illustrated an offshore platform 10 which can be either fixed or movable. For the purpose of describing the method and apparatus of the present invention, a fixed offshore platform has been chosen. However, the present invention is equally applicable to a movable or a floating type of platform at dockside or offshore. The platform is supported by columns 11 which extend into the water below the platform. At one edge of the platform 10, there is a boom 12 mounted upon a base 13 which is adapted for rotational movement upon the platform 10 so that the boom may be swung into a position above a vessel 14. A carrier 15 is used to transfer cargo and/or passengers between the offshore platform 10 and the vessel 14. A constant tension level lifting winch 16 includes a cable drum 17 with a cable 18 extending therefrom over the usual block 19 at the free end of the boom. As shown in FIG. 1, the cable 18 is secured to the carrier 15 with a depending downhaul cable section 21 having an engagement device 22 on the free end thereof. The engagement device 22 is releasably coupled with an engagement device 23 on the free end of a downhaul cable 24. The downhaul cable 24 extends about a block 25 to a cable drum 26 of a variable constant tension winch 27 on the supply vessel 14. FIG. 2 illustrates essentially the same parts as just described in regard to FIG. 1 except that engagement device 23 of the downhaul winch cable is coupled to the carrier while supported upon a landing platform 28 on the supply vessel. Also, an engagement device 29 is shown on the free end of the cable 18 with the downhaul cable section 21 depending therefrom.

As shown in FIGS. 1 and 2, the cable drum 17 and the cable drum 26 are each coupled to a suitable winch drive 31 which includes a gear reducer 32 driven by a motor 33. An electrically-powered motor may be suitably controlled to develop the desired constant tension levels by the winches. However, according to the preferred embodiment, the winches are each driven through the agency of a hydraulic motor in a fluid control circuit, such as shown in FIG. 3. When the same form of control circuit is used for each winch, tension level control means, as described hereinafter, is adjusted and operated to provide the desired constant tension level. Control circuits of different designs may be used for the winches if desired.

In FIG. 3, the gear reducer 32 has its input shaft coupled to the output shaft of a hydraulic motor 34. Supply lines 35 and 36 deliver pressurized hydraulic fluid to the motor 34 from a reversing pump 37. The pump is driven by an engine or motor 38. The pump 37 further includes a control 39 for controlling the delivery of pressurized hydraulic fluid from a sump 41 to either line 35 or line 36. Rotation of the hydraulic motor 34 is dependent upon which of the lines 35 and 36 deliver hydraulic fluid thereto. Fluid discharged from the hydraulic motor 34 passes into a sump 42 or into sump 41. The pressure in lines 35 and 36 corresponds to the torque output of hydraulic motor 34 and, therefore, to the tension developed by the cable drum, when rotating or stationary, on the cable extending thereform. The present invention provides for controlling the hydraulic fluid pressure in lines 35 and 36 to provide a desired constant tension level. To provide this tension control as well as replenish hydraulic fluid in these lines, a brake valve 43 is coupled through a network of check valves. The pressurized hydraulic fluid from lines 35 and 36 passes through branch lines 44 and 45. The pressurized hydraulic fluid in each branch line urges check valves 46 and 47, coupled to a common fluid sump 48, into their closed position. Thus, when either line 35 or 36 is at atmospheric pressure, fluid may be withdrawn from the sump 48 through the check valve and into the hydraulic supply line 35 or 36. In this way, hydraulic fluid is replenished. Pressurized hydraulic fluid in branch lines 44 and 45 is also applied against check valves 49 and 50, respectively, which feed pressurized fluid passed through these check valves into a line 51. Line 51 is coupled to brake valve 43 and includes a pilot pressure line 52 used to apply a pilot pressure to the brake valve in opposition to the force developed by a spring 53. Thus, depending upon the pressure differential between the force developed by the pilot pressure line 52 and the force developed by spring 53, the braking valve moves between open and closed positions, thus controlling the discharge of pressurized fluid through one of the check valves 49 and 50 from the branch lines coupled to the hydraulic supply lines 35 and 36.

According to the present invention, the winch 16 on the offshore platform is operated as a constant tension level winch by the employment of the control system as just described in regard to FIG. 3. The winch 27 on the supply vessel, however, includes means for modulating the brake valve 43 in a manner to provide two constant tension levels. The modulating means is typically in the form of a device for changing the force applied by spring 53 against the braking valve. Suitable means include, for example, a diaphragm 54 which is controlled to move between two fixed positions through a pneumatic or hydraulic control valve 55. In one position of the diaphragm, the force developed by spring 53 is unloaded to a substantial extent whereby the opposition force developed by the pressure in pilot pressure line 52 opens the valve to a greater extent. This reduces the pressure in line 35 or 36 and correspondingly reduces the torque applied by the hydraulic motor to winch drum 27. However, the torque corresponds to a constant tension level in the winch cable at a tension level which is less than the constant tension level developed by the winch on the platform. By actuating the valve 55 to move the diaphragm into its second position, the spring 53 is pre-tensioned against the pilot pressure developed in line 52 to thereby maintain the hydraulic pressure in line 35 or 36 at a relatively high value. This increases the torque output by the hydraulic motor which, in turn, imposes a second and higher constant tension level on the cable by the winch drum 26.

To establish the constant tension level for the winch located on the offshore platform, a tension level is selected so that it does exceed the sum of the force of gravity on the carrier; the force of gravity of the passengers or cargo; the inertial force due to acceleration of the loaded carrier; and the lower tension level of the winch on the supply vessel.

In FIG. 2, essentially the same parts are shown as heretofore described for transfer of cargo and/or passengers by a carrier from the supply vessel to the offshore platform. As shown in FIG. 2, the carrier is resting upon the platform 28 while coupled to the cable of the downhaul winch 27. The cable for the lifting winch has an engagement device 29 secured thereto. The downhaul cable section 21 is used by personnel onboard the vessel for retrieving the cable incident to connecting the engagement device 29 with the cable 24 and/or carrier.

A vertical acceleration of the carrier and the load is to be established which is in excess of the acceleration by the landing site of the supply vessel from which transfer is to occur so that recontact with the supply vessel by the carrier will not take place should the landing area cable part. The take-up velocity of the lifting winch on the offshore platform is equal to or in excess of the relative vertical velocity between the two platforms at the time the transfer is to take place. This assures elimination of cable slack during the interval when the rate of closure of the carrier is controlled and also when the carrier is secured to the landing site. The maximum take-up velocity should not, of course, exceed the safe working limits for personnel riding on the carrier while taking into consideration the type of physical restraint provided for the personnel.

Establishing the tension levels of the variable tension level winch 27 on the supply vessel demands consideration of factors. These factors include establishing the lower level of the constant tension at a value sufficient to maintain the cables when coupled together taut while the carrier is raised by the lifting winch. The take-up velocity should equal or exceed the relative vertical velocity between the two platforms 10 and 28 when transfer occurs. The higher level of constant tension must as a minimum exceed the difference between the tension level by the lifting winch and the weight of the carrier. This will permit an operator on the supply vessel to lower the carrier while the lifting winch functions to preclude cable slack.

To carry out the method of transferring cargo and/or personnel from an offshore platform onto the vessel and as illustrated in FIG. 1, the carrier 15 is lowered by the lifting winch to a position above the envelope of motions by the landing platform 28. These motions include, of course, the effects produced by wind and seas causing both lateral and vertical movements to the landing platform. The engagement device on the end of the downhaul cable section 21 is accessible to personnel on the supply vessel attending to the transfer operation. The landing platform 28 is positioned vertically beneath the carrier by maneuvering the supply vessel and/or the boom 12. The slackened end of cable section 21 is coupled to engagement device 23 on the cable end of the downhaul winch.

When the landing platform 28 approaches the lifting platform within the envelope of motion, the downhaul winch is set at the higher tension level to eliminate slack in the coupled cables. As the landing platform recedes away from the lifting platform 10, a take-up velocity by the lifting winch is established at a minimum prescribed value which precludes cable slack. The higher tension level by winch 27 is maintained at a zero take-up velocity whereby the carrier remains at a fixed distance above the landing platform as the landing platform rises and falls within the envelope of motion by the supply vessel. As the landing platform falls, the tension level of the lifting winch 16 is exceeded, causing the cable 18 to be paid-out from drum 17; whereas as the landing platform rises, the drum 17 of the lifting winch rotates to shorten the paid-out length of cable. If desired at this juncture, the landing platform may be maneuvered away from the offshore platform to continue the transfer operation while the coupled cables are displaced from a vertical alignment between blocks 19 and 25. The carrier 15 is then pulled down by the downhaul winch 27 onto the landing platform 28 at a rate of closure established by controlling the speed of the downhaul winch while set for operation at the higher of the two tension levels. The carrier 15 is held onto the landing platform by the higher tension level imposed by the downhaul winch, thus permitting the carrier to be loaded or unloaded. Upon completion of the load transfer operation, the downhaul cable 24 is paid-out when the landing platform 28 is closest to the offshore platform 10. Control 39 for the downhaul winch is used for this purpose and the pay-out operation continues until the carrier 15 is lifted clear of the envelope of motion by the supply vessel. The constant tension level of the downhaul winch is then switched to the lower of the two tension levels, causing the carrier to rise under the control of the operator on the offshore platform. At the same time as the tension level of the downhaul winch is reduced, the lower tension level is maintained at a take-up velocity which is above a minimum prescribed value for maintaining the coupled cables taut as the supply vessel rises and falls within the envelope of motion. The carrier continues its upward movement under the control of the operator on the offshore platform.

The final transfer at the landing platform 28 from the offshore platform is concluded by paying out a sufficient length of the downhaul cable so that the engagement devices 22 and 23 are accessible from the deck of the vessel. A sufficient length of cable is paid-out within the envelope of motion by the landing platform while the carrier is supported by the lifting cable above the vessel. When the landing platform 28 approaches the offshore platform 10, the take-up velocity by the lifting winch is reduced to zero. The downhaul cable 24 is then paid-out to obtain slack and the engagement devices 22 and 23 are disengaged.

In the mode of operation illustrated in FIG. 2, the landing platform is positioned vertically below the lifting cable. The lifting cable is paid-out so that the downhaul cable length 21 is accessible from the landing platform. However, the lifting cable is paid-out until sufficient slack in the cable is present for all movements by the landing platform within the envelope of motion by the supply vessel. The higher of the two constant tension levels is selected for the downhaul winch. The lifting cable is then coupled to the carrier and/or downhaul cable. Thereafter, the landing platform may be maneuvered if desired away from the offshore platform to provide increased separation. The lifting cable will then be displaced from the vertical. When the landing platform approaches the lifting platform within the envelope of motion, the lifting winch is actuated to take out cable slack. When the cable is taut, the operation for FIG. 2 is the same as that for FIG. 1.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus to control the rate of closure or separation and the landing site for cargo or personnel during transfer between first and second platforms while subject to vertical or lateral motion, one with respect to the other, said apparatus including the combination of:

a constant tension winch on said first platform, said constant tension winch including means to establish a first constant tension level in the winch cable extending from said first platform, a variable constant tension winch on said second platform, said variable constant tension winch including means to establish second and third constant tension levels in the winch cable extending from said second platform, said second constant tension level being essentially less than said first constant tension level and said third constant tension level being essentially greater than said first constant tension level, engagement means to connect together the cables of said constant tension winch and said variable constant tension winch, carrier means coupled for movement by said cables while connected together by said engagement means, and control means operative to select one of said second and third constant tension levels for establishing the direction of movement of said carrier means between said first platform and said second platform by the relative tension differential between said first constant tension level and the selected second or third constant tension level.

2. The apparatus according to claim 1 wherein said means to establish a first constant tension level includes a control member to adjustably establish a predetermined constant tension level differential with respect to said second and third constant tension levels to provide a desired transfer rate of said carrier means.

3. The apparatus according to claim 2 wherein said predetermined constant tension level differential established by said control member maintains a take-up acceleration to said carrier means with respect to said second platform to a desired take-up velocity.

4. The apparatus according to claim 1 wherein said means to establish second and third constant tension levels include a control member to adjustably establish a predetermined constant tension level differential with respect to said first constant tension level to provide a desired transfer rate of said carrier means.

5. The apparatus according to claim 4 wherein said predetermined constant tension level differential established by said control member maintains a take-up velocity by said carrier means with respect to said second platform to a desired take-up velocity.

6. The apparatus according to claim 1 wherein said first platform includes a fixed offshore platform and said second platform is supported by a vessel.

7. A method for controlling the rate of closure or separation and the landing site of a carrier for cargo or personnel during transfer from a lifting platform onto a landing platform while said platforms are subject one with respect to the other to vertical and/or lateral movement due to waves and/or wind within an envelope of motion, said method including the steps of:

lowering said carrier by the cable of a lifting winch on said lifting platform to an elevation spaced above said landing platform to inhibit contact therewith while said platforms move one with respect to the other pursuant to said envelope of motion, coupling the cable of a downhaul winch on said landing platform to the cable of the lifting winch, eliminating slack in the coupled cables by energizing the downhaul winch while the carrier and landing plaftorms approach each other pursuant to said envelope of motion, energizing said lifting winch to impose a preestablished first constant tension level in the coupled cables to maintain the carrier at a fixed distance above the landing platform, said lifting winch at the preestablished first constant tension level having a wind-up velocity above a prescribed minimum take-up velocity precluding cable slack while said platforms move one with respect to the other pursuant to said envelope of motion, and energizing said downhaul winch to impose a preestablished second constant tension level greater than said first constant tension level and at a controllable wind-up speed on the coupled cables to move the carrier onto the landing platform at a desired rate of closure for landing and support of the carrier on the landing platform.

8. The method according to claim 7 including the further step of positioning the landing platform and carrier into a vertically-aligned relation before said step of coupling the cable of a downhaul winch.

9. The method according to claim 8 including the further step of displacing the landing platform into a laterally-spaced location from said vertically-aligned relation with the carrier after said step of energizing said lifting winch.

10. A method for controlling the rate of closure or separation and the landing site of a carrier for cargo or personnel during transfer from a landing platform onto a lifting platform while said platforms are subject one with respect to the other to vertical and/or lateral movement due to waves and/or wind within an envelope of motion, said method including the steps of:

paying out the cable of a lifting winch on said lifting platform to an elevation for access thereto from said landing platform while said platforms move one with respect to the other pursuant to said envelope of motion, said lifting winch having means to preestablish a first constant tension level in the cable thereof, coupling the cable of a downhaul winch on said landing platform to the cable of the lifting winch, said downhaul winch having means to select one of preestablished second and third constant tension levels in the cable thereof, said second constant tension level being less than said first constant tension level and said third constant tension level being greater than said first constant tension level, imposing the said third constant tension level on the coupled cables by energizing the downhaul winch to maintain the carrier on the landing platform, eliminating slack in the coupled cables by energizing the lifting winch while the carrier and lifting platforms approach each other pursuant to said envelope of motion, energizing said lifting winch to impose the preestablished first constant tension level in the coupled cables to maintain the carrier on the landing platform through continued relative motion pursuant to said envelope of motion, said lifting winch at the preestablished first constant tension level having a wind-up velocity above a prescribed minimum take-up velocity precluding cable slack while said platforms move one with respect to the other, energizing said downhaul winch to impose said preestablished second constant tension level which is less than said first constant tension level and at a controllable wind-up speed on the coupled cables to move the carrier from the landing platform when the carrier recedes away from the lifting platform, and maintaining the cable take-up velocity by the lifting winch at a value exceeding the vertical relative motion between said platforms.

11. The method according to claim 10 including the further step of displacing the platforms laterally with respect to each other after said step of energizing said lifting winch to the preestablished first constant tension level.

12. The method according to claim 10 including the further step of positioning said landing platform and said lifting winch cable into a vertically-aligned relation before said step of paying out the cable of a lifting winch.

* * * * *